Figure 1:
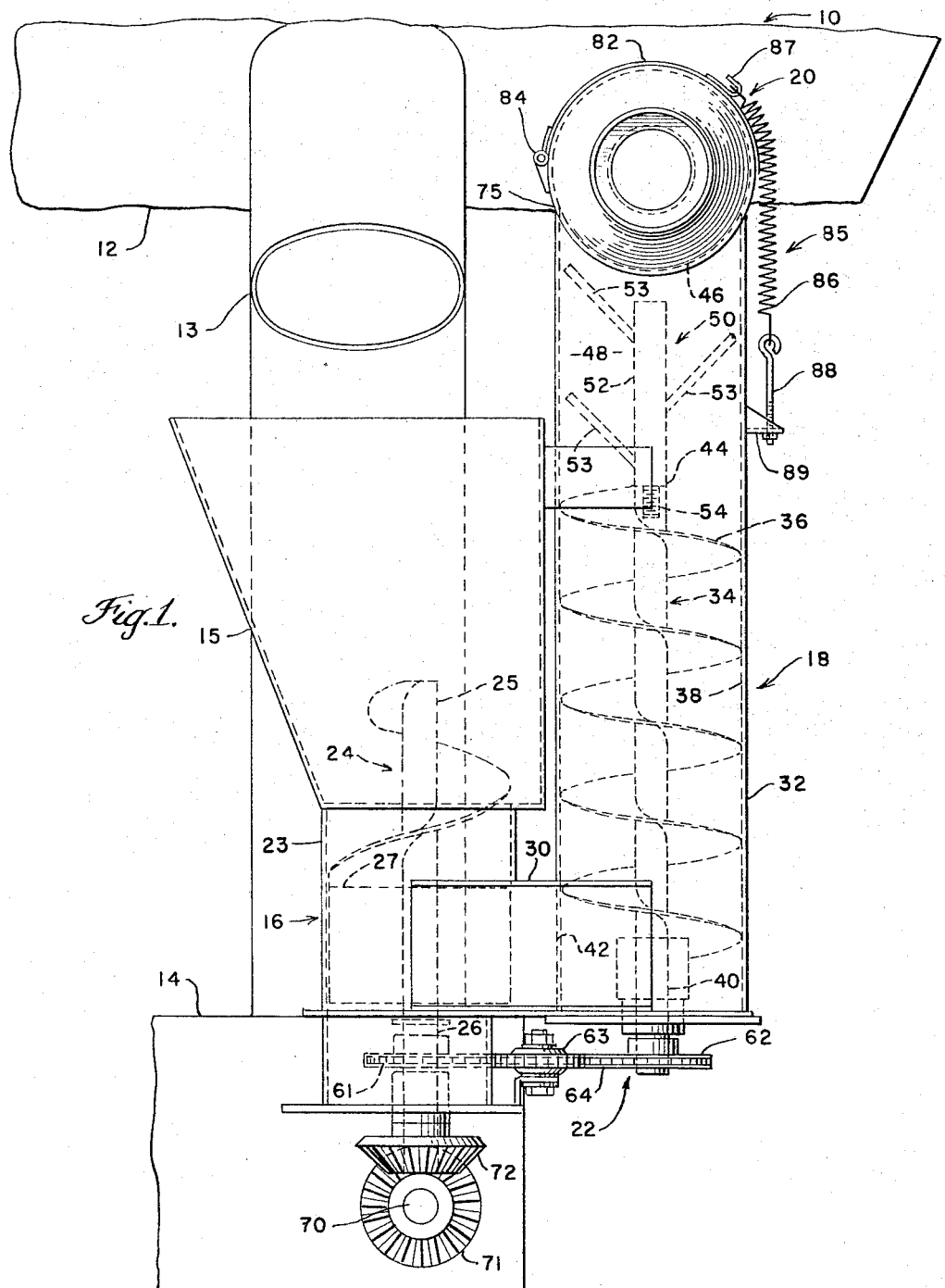

INVENTORS
WILLIAM HOBBS JR.
& WILLIAM W. MANN

BY *Donald D. Schaper*

ATTORNEY

Sept. 6, 1966 W. HOBBS, JR., ET AL 3,271,083
PNEUMATIC CONVEYOR
Filed Sept. 13, 1965 2 Sheets-Sheet 2

INVENTORS
WILLIAM HOBBS JR
& WILLIAM W. MANN
BY *Ronald D. Shapro*
ATTORNEY

United States Patent Office 3,271,083
Patented Sept. 6, 1966

3,271,083
PNEUMATIC CONVEYOR
William Hobbs, Jr., Lancaster, and William W. Mann, Talmage, Pa., assignors to Sperry Rand Corporation, New Holland, Pa., a corporation of Delaware
Filed Sept. 13, 1965, Ser. No. 486,999
10 Claims. (Cl. 302—50)

This invention relates generally to feed handling apparatus. More particularly, this invention relates to a pneumatic conveyor for use on portable feed handling apparatus.

Portable feed handling apparatus, of the type to which this invention is particularly applicable, comprises generally a mobile support frame, a drive means for connection to the power-take-off of a draft vehicle, a hammermill which is provided with a hopper to receive the feed material, a vertically disposed mixing tank which receives the material from the hammermill, auger means within the mixing tank to circulated the feed material to produce a homogeneous mixture, discharge means for unloading the mixing tank, and a dispensing means for depositioning the processed feed material in a bin or other storage facility. One example of the described type of feed handling apparatus is shown in U.S. Patent No. 3,176,926.

One type of dispensing means commonly employed in feed handling equipment comprises an auger, or screw conveyor, which takes the processed material from the mixing tank discharge means and deposits it in the desired storage facility. The main disadvantage with the auger dispensing means is that in many arrangements the auger will not reach to the desired discharge point. Attempts have also been made to use pneumatic conveyors on feed handling apparatus as the dispensing means, since this type of conveyor is easily adapted to different conveying distances. However, difficulties have been experienced with the pneumatic conveyors because of the varying properties of the feed material processed.

In pneumatic conveyors of the type in which an auger delivers material to an air stream, the auger is normally spaced from the air stream so that a column of material, known as a material plug, will build up between the end of the auger and the air stream. This material plug prevents air from blowing back through the delivery auger, and the length of plug required depends on the density and moisture content of the material being conveyed. A comparatively long plug is required for light dry pulverulent material, whereas moist material requires a much shorter plug. Thus, a conveyor designed for dry fine material normally will not efficiently handle wet material, and such a conveyor is not suitable for a grinder-mixer which processes a wide variety of materials. One solution to the problem of conveying various materials has been to make the auger axially movable toward and away from the air stream to regulate the length of the plug. This solution, however, is quite expensive and is not practical where the conveyor is used only for a dispensing means.

Accordingly, one object of this invention is to provide, in an apparatus of the character described, a novel and improved dispensing means.

Another object of this invention is to provide, in an apparatus of the character described, a pneumatic conveyor which will efficiently handle all types of feed material.

Another object of this invention is to provide a pneumatic conveyor with agitating means to prevent plugging in the screw conveyor housing.

Another object of this invention is to provide a pneumatic conveyor with relief means for the conveying tube to prevent plugging in the event the air supply to the conveyor fails.

A further object of this invention is to provide a pneumatic conveyor with a metering means for regulating the flow of feed material to the conveyor tube.

Other objects of the invention will be apparent hereinafter from the specification and from the recital in the appended claims.

Figure 2:
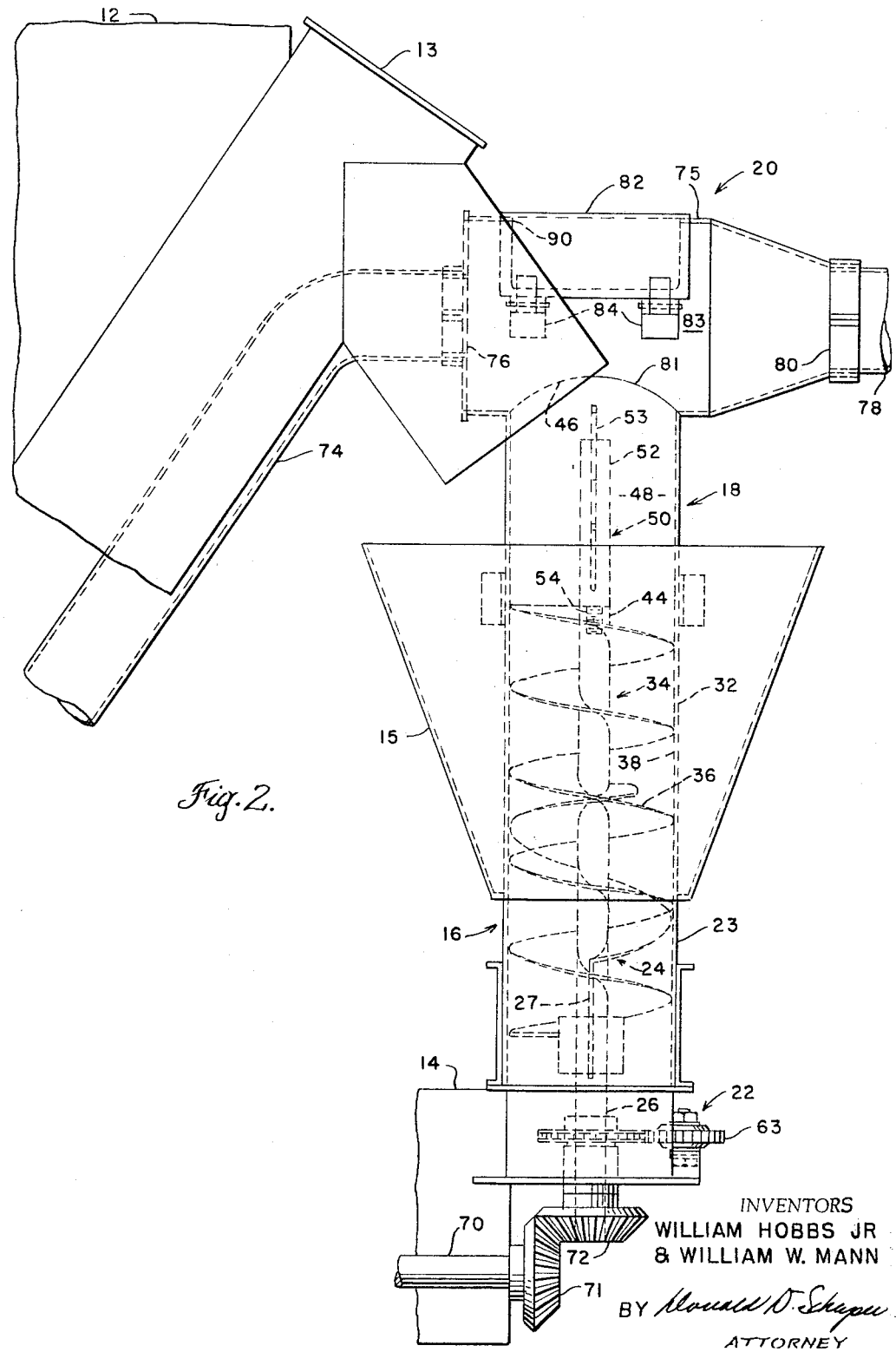

In the drawings:

FIG. 1 is an elevational view of the pneumatic conveyor and showing a portion of the mixing tank of the feed handling machine, with the discharge spout for the tank shown directly above the conveyor receptacle; and FIG. 2 is a side elevational view looking toward the right of FIG. 1 and showing the air inlet and delivery pipes of the conveying tube.

Referring now to the drawings by numerals of references and particularly to FIG. 1, the unloading apparatus of this invention is indicated generally at 10 and comprises a mixing tank 12 (a portion of which is shown), a discharge spout 13 for the mixing tank, a frame element 14, a receptacle 15 for receiving feed material from the discharge spout, a first screw conveyor 16, a second screw conveyor 18 for elevating material to the pneumatic conveyor means, a conveying tube 20, and drive means 22 for the screw conveyors.

The first screw conveyor 16 comprises a cylindrical housing 23 on frame element 14 and in communication with receptacle 15, and a metering auger 24. Auger 24 comprises an upper end 25 which projects into receptacle 15, and end portion 26 which connects to drive means 22, and a pair of radially extending paddles 27 spaced 180 degrees apart on end portion 26. A conduit 30 substantially the height of paddles 27 is arranged in communication with housing 23.

Screw conveyor 18 comprises a vertically extending tubular imperforate housing 32 having an inlet opening 42 at its bottom end in communication with conduit 30 and a discharge opening 46 at its top end, and a feed auger 34 disposed in said housing with flight 36 in close proximity to inner walls 38 of housing 32. A lower receiving end 40 of auger 34 is disposed at housing inlet opening 42, and an upper discharge end 44 terminates substantially below the housing upper discharge opening 46 to define a chamber 48 in housing 32 between the auger discharge end 44 and the housing discharge opening 46.

Disposed within chamber 48 is an agitator 50 comprising a central shaft 52, fan elements 53, and a threaded end portion 54 on central shaft 52 for removably securing the agitatior to discharge end 44 of auger 34. Fan elements 53 are all disposed in the same vertical plane which facilitates removal of agitator 50 through release door 82.

Pneumatic conveyor tube 20 is prependicularly disposed on housing 32 (see FIG. 2) and tube 20 comprises an inlet pipe 74 a center section 75 having an opening 76 in communication with pipe 74, a delivery pipe 78 in communication with an opening 80 in the center section, a bottom opening 81 in communication with discharge opening 46 of housing 32, a release door 82 fastened by hinged connectors 84 to exterior wall 83 of the conveyor tube center section 75 and covering a cutout 90 in wall 83, and a spring latch means 85 for holding the door 82 in place. The spring latch means 85 comprises a helical spring 86 connected to hook 87 on door 82 and to an eye bolt 88. Eye bolt 88 passes through bracket 89 on housing 32 and is removably connected thereto.

Drive means 22 comprises a first sprocket 61 on the end portion 26 of auger 24, second sprocket 62 on end 40 of auger 34, an idler sprocket 63 mounted on frame element 14 spaced from sprockets 61 and 62, and an endless chain 64 extending around sprockets 61 and 62 and past idler sprocket 63. A shaft 70 receives power from the tractor power-take-off and transmits the power through bevel gears 71 and 72 to sprocket 61 which drives sprocket 62 through chain 64.

In operation, augers 24 and 34 are rotated by drive means 22, and compressed air is supplied to the conveyor tube 20 by an air pump (not shown) on the feed handling apparatus. Feed material is received in receptacle 16 through discharge spout 13 after having been processed by the apparatus. Metering auger 24 removes feed material from receptacle 15 at a uniform rate, moves the material downward through housing 23, and then discharges the material transversely into conduit 30. The material is moved through conduit 30 to feed auger 18 by the action of paddles 27 located on the end of auger 24. Feed auger 18 elevates the material to center section 75 of the conveyor tube. Compressed air moving transversely to the direction of travel of the material coming from auger 18 picks up the material and the mixture of feed material and air is discharged through delivering pipe 78 (a portion of which is shown in FIG. 2) which extends to the storage facility.

In the event the supply of compressed air to the conveying tube 20 fails, material will accumulate in section 75 until the section is filled. As auger 34 continues to push more material into the filled section, release door 82 will be forced open against the action of spring 86 and the feed material will flow through cutout 90 until the air failure is dicovered by the operator. Due to the location of door 82 directly opposite the discharge opening 46 of screw conveyor 18, only a small amount of feed material is forced into pipes 74, 78 during the air failure, and in most cases the conveyor will clean itself out when the air supply is resumed. Thus, the safety relief means provided by door 82 prevents the necessity of cleaning out the pipes after an air failure and prevents damage to the conveyor components.

An important feature of this invention is the removable agitator 50 which provides a means for regulating the condition of the material plug in chamber 48 so that the disclosed pneumatic conveyor will function well with all types of feed material. When the feed material is of high moisture content, the conveyor is operated with the agitator in place to keep the material moving into the air stream and at the same time maintain sufficient material plug to prevent blow-back. When the feed material is extremely light or fluffy, agitation of the material plug is not desirable; under these conditions, the agitator is removed from auger end 44 and lifted out of housing 32 through release door 82. Thus, it will be seen that a simple, efficient, inexpensive means is provided for adapting a pneumatic conveyor to handle a variety of feed materials, and thereby making a pneumatic conveyor which is particularly suitable for use with a portable feeding handling machine.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A pneumatic conveyor for dry, fluent material such as forage, shelled corn, feed supplements and other products comprising a vertically extending tubular imperforate housing having an inlet opening at a bottom end and a discharge opening at an upper end, said discharge opening being open in an axial direction relative to said housing, a conveying tube extending perpendicular to said housing and through which a high speed air stream passes, said tube having a bottom opening communicating with said housing discharge opening to receive material therefrom, means for continuously delivering material to said housing through said inlet opening, a vertically extending feed auger within said housing and having flights in close proximity to the housing inner walls, said feed auger having a lower receiving end at said inlet opening and an upper discharge end located below said discharge opening to define a chamber for a material plug between the feed auger and said conveying tube to prevent downward passage of air from the tube and through said housing, an agitator on said auger discharge end and projecting into said chamber to facilitate upward movement of material from the chamber into said conveyor tube, means detachably connecting said agitator to said feed auger whereby the agitator may be removed to provide an unobstructed chamber, said agitator being affixed to said feed auger for rotation therewith and being of such length that it projects through a major portion of said chamber, and drive means for rotating said feed auger.

2. A pneumatic conveyor, as recited in claim 1, wherein said agitator comprises a central shaft, a plurality of fan elements project from said shaft, said elements are spaced axially from each other on said shaft, and said elements are all in the same vertical plane.

3. A pneumatic conveyor, as recited in claim 1, wherein said conveying tube has a cutout in a top wall portion, said cutout is opposite said bottom opening in the conveying tube, a release door covers said cutout, spring means releasably holds said door over said cutout, whereby feed material may pass through said cutout if said air stream is discontinued and said feed auger continues to deliver feed material to the conveyor tube.

4. A pneumatic conveyor, as recited in claim 1, wherein said means for continuously delivering material comprises a first vertically disposed screw conveyor which extends alongside said housing, a receptacle for receiving feed material is mounted in communication with an inlet end of said screw conveyor, said screw conveyor has an outlet end in communication with the inlet opening of said housing, and said drive means is operatively connected to said screw conveyor.

5. A pneumatic conveyor, as recited in claim 4, wherein said first conveyor comprises a metering auger, an upper end of said metering auger extends into said receptacle, and radially extending paddles are mounted on an opposite end of the auger for moving material transverse to the longitudinal axis of said metering auger.

6. A pneumatic conveyor, as recited in claim 4, wherein said drive means comprises a first sprocket on said metering auger, a second sprocket on said feed auger, an endless chain around each of said sprokets, and power means connected to one of said sprockets for driving said augers.

7. A pneumatic conveyor comprising a receptacle for receiving processed feed material from a mixing tank, a first vertically disposed screw conveyor having an inlet end in communication with said receptacle and an outlet end, a second vertically disposed screw conveyor having a discharge opening at an upper end and an inlet opening at a bottom end, a conduit joining said outlet end with said inlet opening, a conveying tube in communication with said discharge opening, said tube having a first opening on one portion thereof for receiving compressed air from a supply source and a second opening on a second portion for the discharge of a mixture of air and feed material, a feed auger in said second conveyor extending upward from said inlet opening and having discharge end terminating short of said tube, an agitator removably mounted on said discharge end, and a drive means for said screw conveyors.

8. A pneumatic conveyor, as recited in claim 7, wherein said first conveyor comprises a metering auger, an upper end of said metering auger extends into said receptacle, and radially extending paddles are mounted on an opposite end for moving material transverse to the longitudinal axis of said metering auger.

9. A pneumatic conveyor, as recited in claim 7, said tube has a cutout in a top wall portion, a release door covers said cutout and spring means normally urges said door in contact with said wall portion.

10. A pneumatic conveyor, as recited in claim 7, wherein said drive means comprises a first sproket on said metering auger, a second sprocket on said feed auger, an endless chain around each of said sprockets, and power means connected to one of said sprockets for driving said augers.

References Cited by the Examiner

UNITED STATES PATENTS

| 1,186,302 | 6/1916 | Freeman | 198—213 |
| 2,127,693 | 8/1938 | McCanless et al. | 302—50 |
| 2,543,344 | 2/1951 | Tutsch | 302—50 |
| 3,169,799 | 2/1965 | Puckett et al. | 302—50 |

ANDRES H. NIELSEN, *Primary Examiner*.